Figure 1:
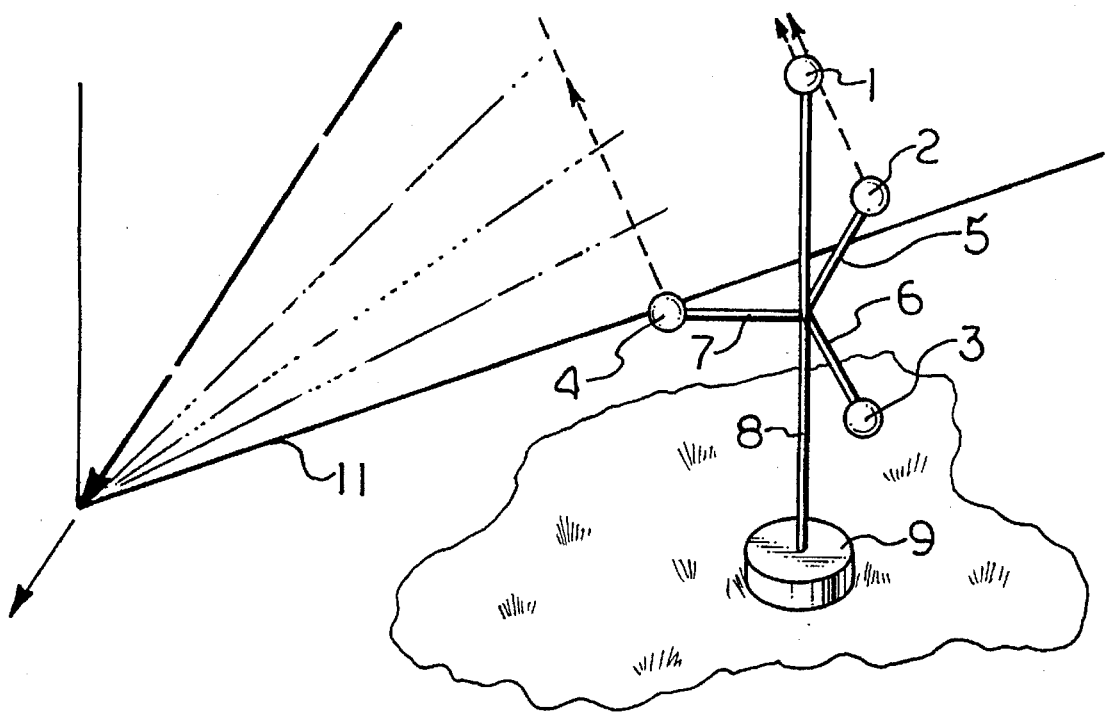

United States Patent [19]

Edwards

[11] Patent Number: 5,638,298

[45] Date of Patent: Jun. 10, 1997

[54] SHOT-TRACKING DEVICE AND METHOD

[76] Inventor: David G. Edwards, Redcroft, St. Nicholas Avenue, Cranleigh, Surrey GU6 7AO, England

[21] Appl. No.: 505,645

[22] Filed: Jul. 21, 1995

[51] Int. Cl.$^6$ ........................................ G01S 7/00
[52] U.S. Cl. ................................ 364/516; 73/167
[58] Field of Search ................ 364/516; 273/372; 367/145, 127, 906, 118; 434/17; 73/167, 170.15

[56] References Cited

U.S. PATENT DOCUMENTS

| | | | |
|---|---|---|---|
| 4,261,579 | 4/1981 | Bowyer et al. | 273/372 |
| 5,241,518 | 8/1993 | McNelis et al. | 367/127 |
| 5,435,178 | 7/1995 | Edwards | 73/170.15 |

FOREIGN PATENT DOCUMENTS 2246861  12/1992  United Kingdom ................. 73/170.15

OTHER PUBLICATIONS

Dobson, "Bullet Direction Finder Shows Where the Snipers are Hiding," *The Sunday Times*, 19 Jun. 1994, London, England, Innovation & Technology.

*Primary Examiner*—Ellis B. Ramirez
*Assistant Examiner*—Thomas Peeso
*Attorney, Agent, or Firm*—Christopher John Rudy

[57] ABSTRACT

A source of a high speed missile is determined by detecting the shock wave generated by the passage of the missile using a plurality of blast gauges and using the amplitude and direction information from the gauges to calculate the azimuth angle of the track of the missile, the elevation of the track and the miss distance from the location of the gauges. The amplitude and direction information can also be used to calculate the velocity of the missile on at least one point along its track. The apparatus for comprises a plurality of blast gauges arranged to receive shock waves generated by the missile at different locations, a computer arranged to receive amplitude and direction data from the gauges and to perform the necessary calculations and display units for presenting the calculated information. Each blast gauge comprises a spherical fairing containing four pressure sensors whose positions on the surface of the sphere form the apices of a tetrahedron. Preferably four blast gauges are used laid out in a symmetrical three-dimensional array. The four gauges can form the apices of a tetrahedron in which one face lies in a horizontal plane. The spherical fairings are carried by tubular supports which contain the signal leads from the sensors.

20 Claims, 2 Drawing Sheets

SHOT-TRACKING DEVICE AND METHOD

FIELD OF THE INVENTION

This invention relates to shot-tracking devices and methods, particularly to devices and methods for tracking and locating the source of bullets, shells and similar missiles.

BACKGROUND TO THE INVENTION

A blast gauge comprising a spherical fairing containing four pressure sensors whose positions on the surface of the sphere form the apices of a tetrahedron is described in United Kingdom patent 2 246 861. See also, Edwards, U.S. Ser. No. 07/969,159, U.S. Pat. No. 5,435,178. The gauge is a non-directional device which will record the amplitude of a blast wave regardless of its orientation. The gauge is also capable of providing directional information for each wave reaching it. The signals from pressure sensors in the gauge are fed to signal processing means where the amplitude of the incident pressure on each sensor and its time of occurrence are stored. The stored information may be used to provide details of the amplitude and direction of successive blast waves which fall on the gauge following an initial event.

The above described equipment provides azimuth (bearing) information only on the path of a missile. The source of the missile has to be estimated by visual assessment of the terrain involved.

See also, *The Sunday Times*, Jun. 19, 1994, "Bullet direction finder shows where the snipers are hiding."

SUMMARY AND FURTHER EMBODIMENTS

The present invention provides a method and apparatus for defining the source of a missile by use of a plurality of blast gauges of the type described.

According to the present invention there is provided a method of defining the source of a high speed missile wherein the shock wave generated by the passage of the missile is detected by a plurality of blast gauges and the amplitude and direction information from the gauges is used to calculate the azimuth angle of the track of the missile, the elevation of the track and the miss distance from the location of the gauges. In a further embodiment the velocity of the missile along the track may be provided.

There is further provided apparatus for defining the source of a high speed missile comprising a plurality of blast gauges arranged to receive shock waves generated by the missile at different locations, computer means arranged to receive amplitude and direction data from the gauges and to calculate the azimuth angle of the track of the missile, the elevation of the track and the miss distance from the location of the gauges, and display means for presenting the calculated information.

In a further embodiment the velocity of the missile along the track may be calculated.

In a preferred embodiment the output data from a symmetrical three-dimensional array comprising four blast gauges of the type described in GB-A-2 246 861 or U.S. Pat. No. 5,438,178 is supplied to a computer. The time differences and directional data from the shock waves sensed by the gauges is used to calculate and display the location of the source of the missile.

In a further embodiment, particularly useful when the missile is fired from weapon having a barrel, both the shock wave and the muzzle blast are recorded. This information is used to calculate the range of the source on the basis of the velocity of the missile, calculated from the shock wave signals received by the blast gauges, and the velocity of sound in air established on the basis of prevailing conditions of temperature, humidity and wind.

Unlike radar based systems, such as those code named Green Archer and Cymberline, use of the blast gauges according to the invention does not emit any electromagnetic or audible signal which may be used to locate it; the system is inherently secure from detection.

Due to the low power consumption and the passive nature of the detection system it is eminently suited for battlefield surveillance and as a force multiplier for small detachments of personnel in hostile territory.

The spherical blast gauges may be 200 mm diameter or 50 mm diameter types; the former provide higher accuracy. The array of four gauges is preferably mounted on a hollow post capped by the highest gauge. The signal and power supply leads from this gauge are passed through the post to an exit at the base. The three other gauges are mounted on tubular arms at 120° intervals so that they are symetrically spaced around the post. The leads from these gauges are passed through the arms to the post and on to the exit at the base. The arms may be horizontal or directed downwardly to increase the distance from the highest gauge. Due to their weight 200 mm diameter gauges must be dismounted for transport. The 50 mm diameter gauges may be permanently attached to their associated arms which are preferably pivotally mounted on the central post. Such an arrangement allows the arms to be folded inwards to reduce the space needed for transport.

DRAWINGS IN BRIEF

Figure 2:
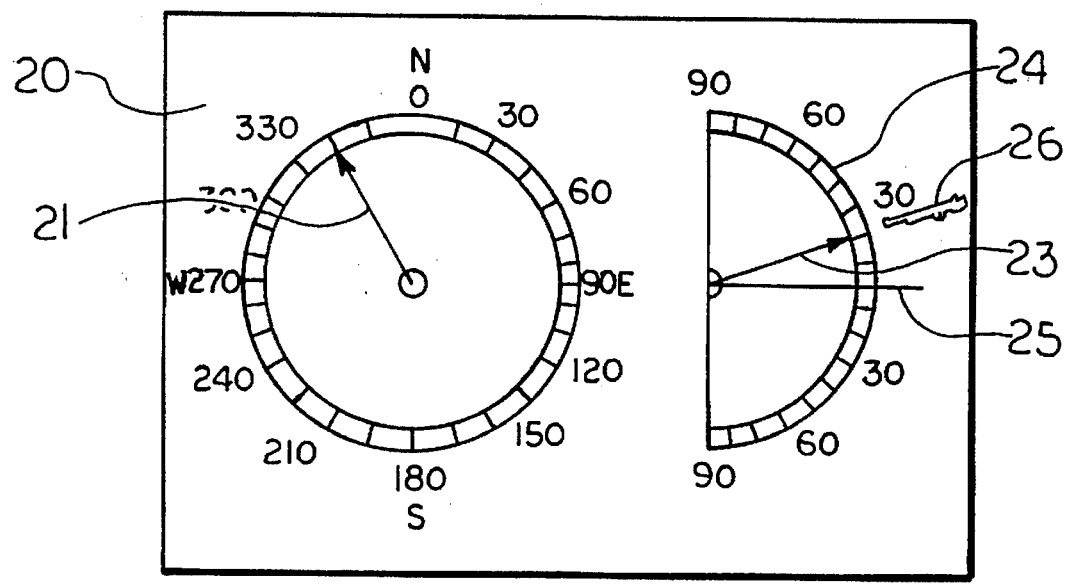
Figure 3:
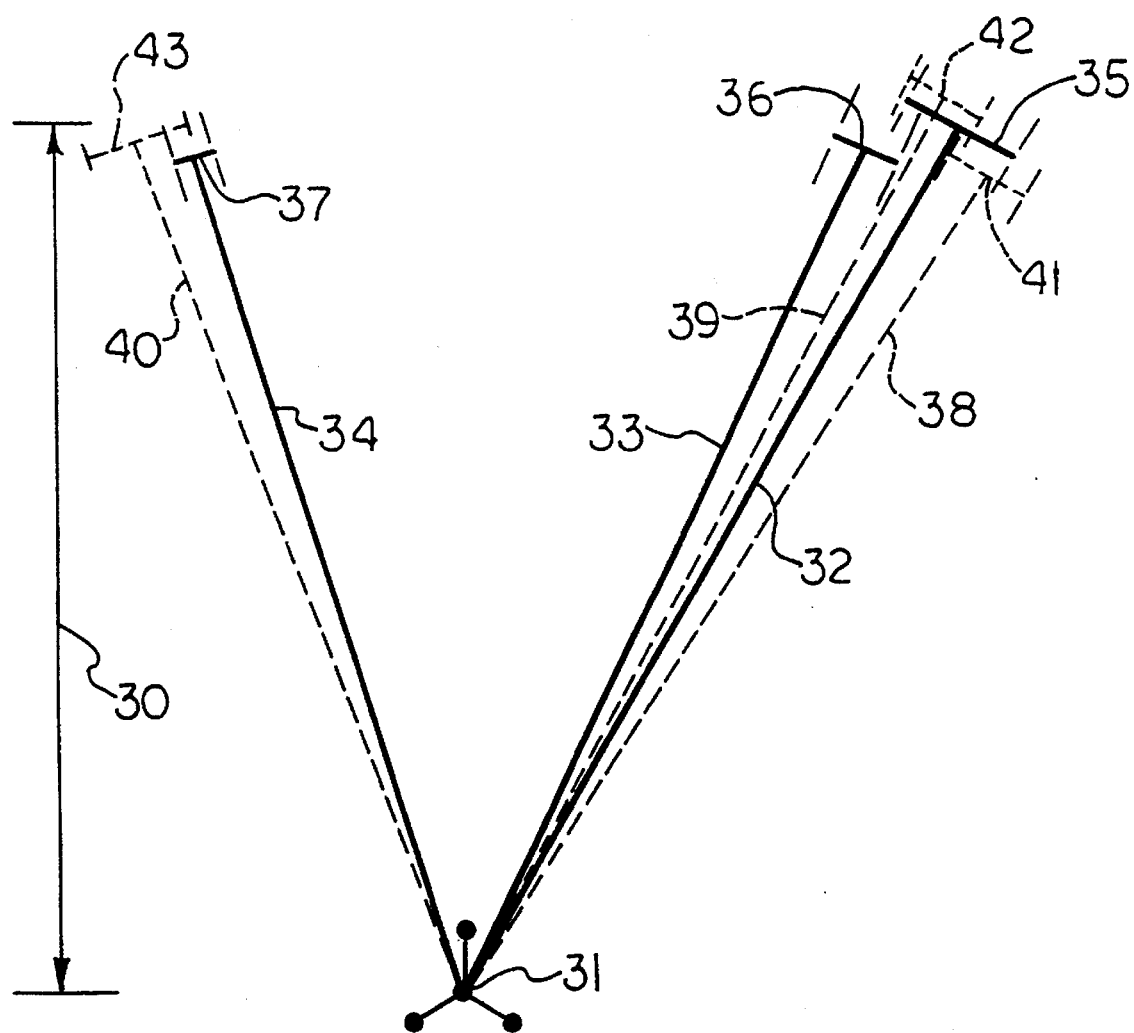

In order that the invention may be more clearly understood it will now be described with reference to the accompanying drawings in which:

FIG. 1 shows an array of blast gauges for use in the method of defining the source of a high speed missile according to the invention, FIG. 2 shows one form of display particularly suited for field use, and FIG. 3 illustrates the results of a series of tests in which gun positions determined by according to the invention are compared with the same positions as established by a satellite-based global positioning system.

FURTHER ILLUSTRATIVE DETAIL

A set of four blast gauges 1, 2, 3 and 4, see FIG. 1, are attached directly or by arms 5, 6 and 7 to a post 8 to form an array. The post 8 stands vertically on the ground and is stabilized by a plinth 9. The power and signal leads, not shown, from the blast gauges 2, 3 and 4 pass through the cores of the respective supporting arms 5, 6 and 7 into the core of the post 8. The power and signal leads from the blast gauge 1 enter the post 8 directly. The leads leave the post 8 near to the plinth 9 and feed signals into computing equipment, not shown. The exact location of the center of the array is preferably determined before use so that bearing and range information can be easily entered on charts or maps of the area.

When a missile, such as a bullet or shell, passes the array the sensors in each gauge 1, 2, 3 and 4 will record the passage of the associated shock wave 11. After computation of the signals from the sensors, as described in U.K. patent 2 246 861, and U.S. Ser. No. 07/969,159 filed Feb. 5, 1993 (U.S. Pat. No. 5,435,178 issue date Jul. 25, 1995) which is incorporated herein by reference, azimuth and elevation data relating to the date relating to the source of the missile can be obtained and displayed. A convenient form of display, see FIG. 2, is cathode ray tube or liquid crystal display 20 showing the azimuth direction of the missile as an arrow 21 directed to the periphery of a circular scale 22 marked as a compass. The elevation of the source with respect to the array is shown as an arrow 23 directed to a supplementary semi-circular scale 24 showing elevation in-degrees above or below a horizontal plane 25 through the array. The elevation angle is emphasized by a displayed weapon 26.

Further computation of this data from all four gauges enables the direction of the path travelled by the missile in three dimensions to be obtained. The computation will also provide the miss distance between the missile and the array, i.e. the shortest distance between the missile path and the array. Further information that can be provided includes the azimuth direction from the array to the nearest point on the path of the missile and also the speed of the missile.

The data calculated after the passage of each missile can be stored and compared. It is thus possible to show major sources of bullets and missiles such as the location of a concealed sniper or artillery piece.

By detecting both the shock wave of a missile and the subsequent muzzle blast wave it is possible for the computing means to calculate the range of the source. Apart from the detected waves it is necessary to provide details of the temperature, pressure and humidity of the ambient air together with wind direction. These factors will affect the velocity of the muzzle blast wave, its time of arrival at the array and in consequence the accuracy of the predicted source.

FURTHER ILLUSTRATIVE EXAMPLE

A test was carried out at on a range authorized for the discharge of military firearms. An array as herein described was erected and rifle rounds were discharged from concealed weapons in the direction of the array to simulate an attack by a sniper. The weapons were standard SA80 assault rifles having a caliber of 5.56 mm. Three different positions were used for the attack, each in the region of 300 meters from the array. A plan of the location, see FIG. 3, shows a scale line 30 representing a length of 300 meters and the location of an array 31. The bold lines 32, 33 and 34 represent the paths of the bullets as calculated by the missile detection system. The terminal lines 35, 36 and 37 show the possible error on each sniper location. The directional information was between that three degrees. The dashed lines 38, 39 and 40 represent the true paths of the bullets calculated on the basis of the locations of the snipers as determined by a satellite-based global positioning system. The terminal lines 41, 42 and 43 show the possible error in the location as determined by the positioning system. It will be seen that sniper locations can be determined with a high degree of accuracy so that in combat conditions action could easily be taken to neutralize their fire.

CONCLUSION

The present invention is thus provided. Numerous adaptations and modifications can be effected within its spirit, the literal claim scope of which is particularly pointed out as follows:

I claim:

1. A method of defining a source of a high speed missile, the method comprising:

detecting a shock wave generated by the passage of the missile using a plurality of blast gauges;

using amplitude and direction information from the gauges to calculate an azimuth angle of a track of the missile, elevation of the track of the missile and miss distance from location of the gauges.

2. The method of claim 1, wherein amplitude and direction information is used to calculate velocity of the missile on at least one point along its track.

3. The method of claim 2, wherein the shock wave is detected by four blast gauges in a symmetrical three-dimensional array.

4. The method of claim 3, wherein the four blast gauges form apices of a tetrahedron in which one face lies on a horizontal plane.

5. The method of claim 1, wherein each blast gauge comprises a spherical fairing containing four pressure sensors whose positions on a surface of the fairing form apices of a tetrahedron, and wherein the fairing comprises a metal sphere with cavities adapted to house the pressure sensors.

6. The method of claim 5, wherein the shock wave is detected by four blast gauges in a symmetrical three-dimensional array wherein the four blast gauges form apices of a tetrahedron in which one face lies on a horizontal plane.

7. The method of claim 1, wherein the shock wave is detected by four blast gauges in a symmetrical three-dimensional array.

8. The method of claim 7, wherein the four blast gauges form apices of a tetrahedron in which one face lies on a horizontal plane.

9. An apparatus useful for defining a source of a high speed missile comprising a plurality of blast gauges arranged so as to be able to receive shock waves generated by the missile at different locations, a computer means arranged so as to be able to receive amplitude and direction data from the gauges and to calculate an azimuth angle of a track of the missile, elevation of the track of the missile, and miss distance, from the location of the gauges, and a display means for presenting the calculated information, wherein each blast gauge comprises a spherical fairing containing four pressure sensors which positions on a surface of the fairing form apices of a tetrahedron.

10. The apparatus of claim 9, wherein the amplitude and direction information can be used to calculate velocity of the missile on at least one point along its track.

11. The apparatus of claim 10, wherein the fairing comprises a metal sphere with cavities adapted to house the pressure sensors.

12. The apparatus of claim 11, which comprises four blast gauges in a symmetrical three-dimensional array.

13. The apparatus of claim 12, wherein the four blast gauges form apices of a tetrahedron in which one face lies on a horizontal plane.

14. The apparatus of claim 10, which comprises four blast gauges in a symmetrical three-dimensional array.

15. The apparatus of claim 14, wherein the four blast gauges form apices of a tetrahedron in which one face lies on a horizontal plane.

16. The apparatus of claim 9, wherein the fairing comprises a metal sphere with cavities adapted to house the pressure sensors.

17. The apparatus of claim 16, which comprises four blast gauges in a symmetrical three-dimensional array.

18. The apparatus of claim 17, wherein the four blast gauges form apices of a tetrahedron in which one face lies on a horizontal plane.

19. The apparatus of claim 9, which comprises four blast gauges in a symmetrical three-dimensional array.

20. The apparatus of claim 19, wherein the four blast gauges form apices of a tetrahedron in which one face lies on a horizontal plane.

* * * * *